United States Patent [19]

Yoshida et al.

[11] 4,426,271
[45] * Jan. 17, 1984

[54] HOMOGENEOUS CATION EXCHANGE MEMBRANE HAVING A MULTI-LAYER STRUCTURE

[75] Inventors: Mitsuo Yoshida; Yoshinori Masuda; Akio Kashiwada, all of Nobeoka, Japan

[73] Assignee: Asahi Kasei Kogyo Kabushiki Kaisha, Osaka, Japan

[*] Notice: The portion of the term of this patent subsequent to Apr. 6, 1999 has been disclaimed.

[21] Appl. No.: 252,280

[22] Filed: Apr. 9, 1981

[30] Foreign Application Priority Data

Apr. 15, 1980 [JP] Japan .................................. 55-48633
Aug. 15, 1980 [JP] Japan ................................. 55-111810

[51] Int. Cl.³ ........................ C25F 1/34; C25F 13/02
[52] U.S. Cl. ........................................ 204/296; 204/98; 204/128; 204/283
[58] Field of Search ................. 204/98, 128, 296, 283

[56] References Cited

U.S. PATENT DOCUMENTS 4,191,618 3/1980 Coher et al. ........................ 204/98
4,272,353 6/1981 Lawrance et al. ................ 204/296
4,323,434 4/1982 Yoshida et al. ................... 204/296

Primary Examiner—R. L. Andrews
Attorney, Agent, or Firm—Birch, Stewart, Kolasch & Birch

[57] ABSTRACT

In cation exchange membranes having a multi-layer structure consisting of two or three layers or more each having different equivalent weight and/or different kind of ion exchange group used for the electrolysis of alkali metal chloride according to an ion exchange membrane process, a homogeneous cation exchange membrane which comprises that at least one outer layer having a lower water content of both outer layers of said membrane has a roughened surface so that the amount of hydrogen gas bubbles generated from the cathode and attached to the membrane surface is the least whereby the electrolysis voltage is the lowest and the process for the production thereof.

13 Claims, 2 Drawing Figures

HOMOGENEOUS CATION EXCHANGE MEMBRANE HAVING A MULTI-LAYER STRUCTURE

BACKGROUND AND SUMMARY OF THE INVENTION

The present invention relates to an economically advantageous homogeneous cation exchange membrane used for the electrolysis of an alkali metal chloride according to an ion exchange membrane process. More particularly, it relates to a homogeneous cation exchange membrane operable at a low electrolysis voltage and, in addition, at a high current efficiency which comprises, in a cation exchange membrane having a multi-layer structure consisting of two or three layers or more each having different equivalent weight (the weight of dry resin containing 1 equivalent of ion exchange group) and/or different kind of ion exchange group used for the electrolysis of alkali metal chloride according to an ion exchange membrane process, at least one outer layer having a lower water content of both outer layers of said membrane being a roughened surface.

The homogeneous cation exchange membrane mentioned in the present invention refers to a cation exchange membrane prepared only from ion-exchange resins without blending with thermoplastic resins having no ion-exchange group.

Heretofore, it has been proposed to lower the membrane resistance of a heterogeneous ion-exchange membrane prepared from the mixture of an ion-exchange resin and a thermoplastic resin by roughening the surface thereof by brushing treatment of flame treatment to expose thereby the ion-exchange resin to the membrane surface (for instance, see Japanese published unexamined patent application No. 47590/1977).

However, in a homogeneous ion-exchange membrane consisting of only an ion-exchange resin wherein ion-exchange resin itself is exposed to the membrane surface, there is no such decrease in membrane resistance by the application of such a roughening treatment.

Furthermore, in the case of a homogeneous cation exchange membrane, it has been known that, if the membrane surface faced to the cathode side is not smooth, hydrogen gas bubbles generated from the cathode by the electrolysis are attached to the membrane surface whereby electrolysis voltage is increased. Accordingly, for the prevention of this phenomenon, it has been commonly practiced heretofore to incorporate a cation exchange membrane into the electrolytic cell so that the smooth surface of the membrane faces toward the cathode (for instance, see Japanese published unexamined patent application No. 131489/1976).

Generally speaking, it is desirable that a cation exchange membrane to be used in electrolysis of alkali metal chloride by an ion-exchange membrane process has a thickness of 1000 microns or less, preferably 200 microns or less, to decrease the membrane resistance. Insufficient strength of such a thin membrane is reinforced with support fibers. As the method to embed the support fibers into the ion exchange membrane, there are, for instance, illustrated one wherein a thermoplastic ion exchange membrane intermediate prepared by extrusion molding is superposed on support fibers and both of them are thermally pressed (heat-press lamination method), one wherein only one surface of the thermoplastic ion exchange membrane intermediate prepared by extrusion molding is subjected to hydrolysis to be converted to the non-thermoplastic, support fibers are contacted the opposite thermoplastic surface and the side contacted the support fiber is evacuated to embed the support fibers into the membrane while the whole composite is heated (vacuum lamination method, Japanese published examined patent application No. 14670/1977), one wherein the resin in a form of fibril and an ion exchange polymer are preliminarily kneaded and the membrane is made of this kneaded resin (fibril method) and the like. According to the heat-press lamination method and fibril method, both surfaces can be made smooth; and according to the vacuum lamination method, the preliminarily hydrolyzed surface is made smooth. Heretofore, the ion exchange membrane was incorporated into the electrolytic cell so that this smooth surface faced toward the cathode side.

Further, there has been proposed recently a cation exchange membrane having a double layer structure consisting of a lower water content layer and a higher water content layer in order to maintain a high level of current efficiency and to lower the electrolysis voltage in the preparation of an alkali metal hydroxide. For instance, there has been proposed a method wherein a membrane having double layers consisting of a layer having a higher equivalent weight and one having a lower equivalent weight (Japanese published unexamined patent application No. 14184/1976) or a membrane having double layers consisting of a layer having sulfonic acid groups and one having weak acid groups (Japanese published unexamined patent application No. 120999/1977) is utilized for the electrolysis of sodium chloride. In such a case, it is inevitable to incorporate the membrane into the electrolytic cell so that the lower water content layer, namely a layer having a higher equivalent weight or one having weak acid groups faces toward the cathode side. When the support fibers are embedded into the cation exchange membrane having such a double layer structure, the procedure was carried out in such a manner that the support fibers were embedded from the side of the higher water content layer and at least the surface of the lower water content layer was made smooth.

However, the present inventors have found as the result of detailed observation of electrolysis that, surprisingly, the amount of hydrogen gas bubbles generated from the cathode and attached to the membrane surface is the least when the homogeneous cation exchange membrane is moderately roughened on its cathode side, whereby the electrolysis voltage is the lowest.

That is, the object of the present invention is, in the case of the homogeneous cation exchange membrane having a double layer structure consisting of layers having different equivalent weights and/or kinds of ion exchange group, to further lower the electrolysis voltage while maintaining the current efficiency at a high level. Such an object can be effectively attained by the present invention wherein the surface of the lower water content layer of the cation exchange membrane is roughened.

In the accompanying drawings.

DETAILED DESCRIPTION OF THE INVENTION

Figure 1:
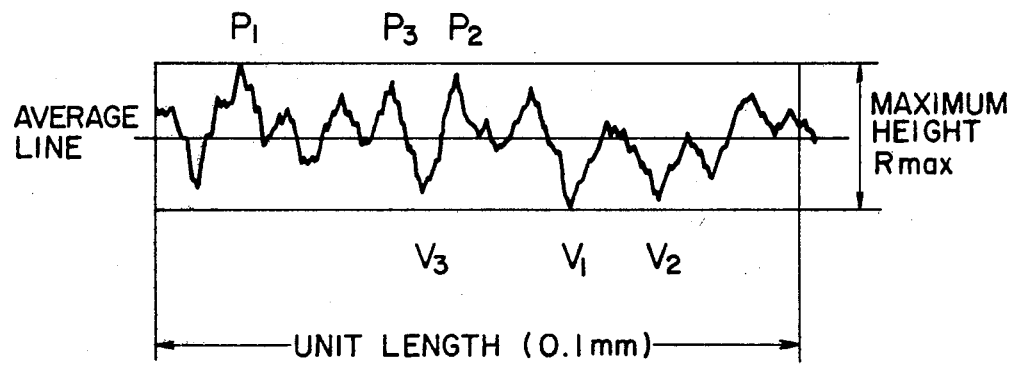
FIG. 1 shows the method to obtain the maximum height from the roughness curve recorded.

The cation exchange membrane of the present invention which has the multi-layer structure and is subjected to surface-roughening treatment causes almost no attachment of hydrogen gas bubbles generated from the cathode to the membrane surface; accordingly, it is an economically advantageous membrane operable at a low electrolysis voltage and at a high current efficiency.

In electrolysis of an alkali metal chloride according to an ion exchange membrane process, there is advantageously used a two-compartment process in which the anode compartment and the cathode compartment are partitioned with one sheet of cation exchange membrane. As said cation exchange membrane, there may usually be used a fluorocarbon type homogeneous cation exchange membrane which is excellent in heat resistance, chemical resistance and mechanical strength. The present invention is particularly effective for a fluorocarbon type cation exchange membrane probably owing to the prevention of easier attachment of gas compared with a hydrocarbon type cation exchange membrane.

Each layer of the cation exchange membrane of the present invention having a multi-layer structure wherein each layer has different water content is distinguished from other layers owing to the equivalent weight and/or the kind of ion exchange group. Though the same equivalent weight and/or ion exchange group as those in the adjacent layer may exist in one layer, the ratio of existence thereof is preferably not higher than 50%, particularly preferably not higher than 25%. Also at the interface of the layers, the density of different equivalent weights and/or that of ion exchange groups in adjacent layers may vary continuously. Also, though ion exchange resins having different equivalent weights and/or different kinds of ion exchange group exist in mixed state in each layer, one layer may be distinguished from the other according to the difference of composition ratio.

The interfaces of each layer can be dyed in various colors by appropriately varying the dying temperature, dying time or pH of the dying liquid; or the IR absorption spectra of the surface are measured while the membrane is scraped at the surface, then the interfaces of each layer can be observed by following the variation of the densities of various exchange groups with the depth of scraping.

The water content of the cation exchange membrane is measured according to the following method. After immersing the cation exchange membrane in a 0.1 N aqueous solution of sodium hydroxide at 90° C. for 25 hours, it is washed with pure water. After sufficiently wiping off the water attached to the surface, the weight of the membrane ($W_1$ g) is measured. Then the membrane is dried under vacuum and the weight thereof ($W_0$ g) is measured.

$$\text{Water content} = \frac{W_1 - W_0}{W_0} \times 100 \, (\%)$$

In the case of the cation exchange membrane reinforced with fibers, the water contained by the fibers causes an error in the measurement of water content. Accordingly, the measurement and comparison have to be conducted with a membrane not reinforced with fibers.

The reason why the electrolysis voltage can be lowered by incorporating the cation exchange membrane into the electrolytic cell so that, after the outer layer having a lower water content is subjected to the surface-roughening treatment, said roughened surface thereof faces toward the cathode side is that hydrogen gas bubbles generated from the cathode by the electrolysis difficulty attach to the cathode side surface of the membrane, because the elevation of the electrolysis voltage due to the attachment of hydrogen gas bubbles to the cathode side surface of the membrane is caused by (1) electrical shielding by attached bubbles, (2) decrease in diffusion velocity of highly concentrated sodium hydroxide at the membrane-liquid interface and the like.

On the one hand, chlorine gas generated at the anode by the electrolysis has fairly larger bubble diameters compared with these of hydrogen gas and, therefore, it is difficultly attached to the anode side surface of the homogeneous cation exchange membrane. For this reason, it is not necessarily required to roughen the anode side surface of the homogeneous cation exchange membrane for the purpose of lowering electrolysis voltage.

The roughened surface of the present invention is a conception opposite to that of the glassy surface. The roughened surface may quantitatively be defined as a surface having a concavo-convex structure wherein the maximum height is preferably 0.05 micron or more and there are 20 concavo-convex portions or more per 1 mm which have roughness of 0.05 micron or more. More preferably, the maximum height is from 0.05 to 5 microns and there are 30 to 250 concavo-convex portions per 1 mm with roughness of 0.05 micron or more, whereby gas attachment to the membrane surface can be made very little. When the maximum height of the roughened surface is less than 0.05 micron, the effect for prevention of the membrane surface from gas attachment is small. Also the gas attachment prevention effect is small if the number of concavo-convex portions with roughness of 0.05 micron or more per 1 mm is less than 20.

The extent of gas attachment to the membrane surface can be confirmed by, for example, the observation of the membrane surface when the electrolysis is carried out in an electrolytic cell made of transparent acrylic resin into which the membrane to be measured is incorporated.

Measurement of the surface roughness of a cation exchange membrane is possible by the stylus method using an omniponent instrument for the measurement of surface roughness (Type Surfcom 60 B, manufactured by Tokyo Seimitsu Co., Ltd.). When a stylus is placed on a membrane surface and traversed thereon, the stylus moves up and down according to concavo-convex irregularities of the surface. This up and down movement is converted to electrical signal which is then recorded on a recording paper. Usually a cation exchange membrane is so soft that it may be easily deformed by the stylus. Hence, in the measurement of surface roughness, it is desirable to use a pick-up having a round shape of 10 $\mu$mR or more at the tip of the stylus and a measuring force of 0.1 g or less. In the present invention, there was used a pick-up having a shape of 13 $\mu$mR at the tip of the stylus and a measuring force of 0.07 g. A cation exchange membrane is frequently reinforced with support fibers and such a reinforced membrane has large concavo-convex portions (surface undulation) due to support fibers. In order to distinguish surface roughness from said surface undulation, it is desirable to cut off wavelengths longer than a specified wavelength by allowing the electrical signals to pass through an electrical filter. In the present invention, the measurement was conducted setting the cut-off value at 0.032 mm.

The maximum height mentioned in the present invention is measured by the following method which applies corresponding to JIS B0601. That is, when a standard length of 0.1 mm is drawn out from the roughness curve measured at the cut-off value of 0.032 mm and the drawn out section is put between two straight lines parallel to the average line of the drawn out section, the distance between these two straight lines in the direction of the longitudinal magnification of the roughness curve is measured. For instance, in FIG. 1, among the straight lines parallel to the average line of the section drawn out in standard length of 0.1 mm, the interval $R_{max}$ between the line which passes the highest peak $P_1$ and the line which passes the lowest valley $V_1$ is called the maximum height. Measurements are carried out 10 times on various places in the same sample and the values obtained are averaged. In the determination of such a maximum height, the standard length should be drawn out only from portions having no exceptionally high peak or valley which is to be regarded as a scratch.

Figure 2:
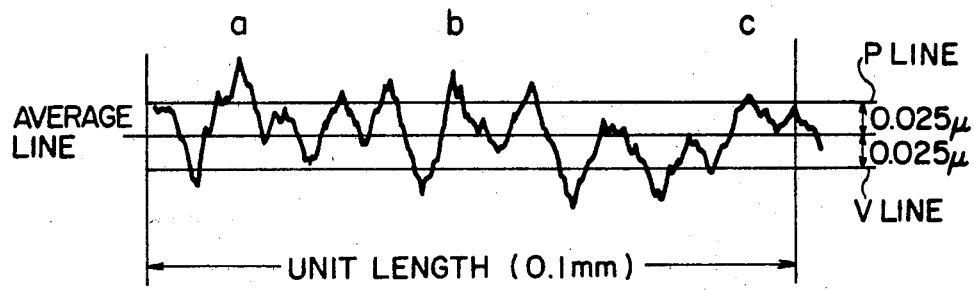
FIG. 2 shows the method to obtain the number of concavo-convex portions with roughness of 0.05 micron or more from the roughness curve recorded.

The number of concavo-convex portions per 1 mm having a roughness of 0.05 micron or more mentioned in the present invention is determined by the following method which applies corresponding to U.S. SAE Standard J 911. That is, a standard length of 0.1 mm is drawn out from the roughness curve measured at the cut-off value of 0.032 mm. Two straight lines are drawn so that one is at a level of $(+)0.025$ micron and the other is at a level of $(-)0.025$ micron to the average line of the drawn out section (P line and V line, respectively). The peak which passes V line and then P line is counted as one peak and the number of such peaks per 0.1 mm is counted. For example, in FIG. 2, the number of peaks which pass V-line and then P-line is three, or a, b and c. Measurements are conducted at 10 different places in the same sample and the number per 1 mm is given by averaging the values obtained.

In the present invention, the homogeneous cation exchange membrane having a multi-layer structure used after at least the outer layer having lower water content of the outer layers is roughened is preferably a fluorocarbon type homogeneous cation exchange membrane which prevents the anolyte or catholyte from passing through the membrane due to the hydraulic flow. It is not desirable that the anolyte or catholyte passes through the membrane due to the hydraulic flow because the quality of the product produced by the electrolysis of salt water is lowered. As such fluorocarbon type homogeneous cation exchange membranes, there are (1) sulfonic acid type cation exchange membrane, (2) sulfonamide type cation exchange membrane, (3) carboxylic acid type cation exchange membrane, (4) phosphoric acid type cation exchange membrane and the like. However, the present invention is not limited to these membranes, but it can be applied to all homogeneous cation exchange membranes.

In order to produce a cation exchange membrane having a multi-layer structure consisting of two or three layers or more each having different equivalent weight and/or different kind of ion exchange group, there can be illustrated methods such as, for instance, (1) one wherein two or three membranes or more each having different equivalent weight and/or different kind of ion exchange group are superposed and laminated and (2) one wherein the equivalent weight and/or the kind of ion exchange group is changed by treating only one side of the cation exchange membrane. However, the method is not limited to these ones.

Cation exchange membranes having a multi-layer structure which are preferable for the present invention are illustrated hereinbelow. (1) A sulfonic acid membrane prepared by laminating two kinds of film each having different equivalent weight made of a copolymer of $CXX'=CFY$ (wherein X and X' are respectively F, Cl or H; Y is F or $CF_3$) and $CF_2=CF(OCF_2CFY)_l(O)_{\overline{m}}(CFY)_{\overline{n}}SO_2F$ (wherein l=0–3; n=0 or 1 and n=0–12) (hereafter referred to as polymer-A)(Japanese published examined patent application No. 18994/1979), (2) a carboxylic acid membrane prepared by laminating two sheets of film each having different equivalent weight made of a copolymer of $CXX'=CFY$ and $CF_2=CF(OCF_2CFY)_l(O)_{\overline{m}}(CFY)_{\overline{n}}A$ (wherein A is CN, COF, COOH, $COOR_1$ or $CONR_2R_3$; $R_1$, $R_2$ and $R_3$ are alkyl groups, respectively) (hereafter referred to as polymer-B), (3) a membrane prepared by laminating a film made of polymer-A and a film made of polymer or a film made of the blended mixture of polymer-A and polymer-B, (4) a membrane prepared by desulfonation of a part of ion exchange groups after thermal treatment, ultraviolet rays treatment, chemical treatment and the like of only one surface of polymer-A film (Japanese published unexamined patent applications Nos. 122677/1976, 55383/1978 and 58493/1978), (5) a sulfonamide membrane prepared by the treatment of only one surface of polymer-A with ammonia, alkylmonoamine or alkyldiamine (Japanese published unexamined patent applications Nos. 44360/1973, 66488/1975, 64495/1976 and 64496/1976), (6) a membrane wherein sulfonamide groups are converted to carboxylic acid groups by the treatment of said sulfonamide membrane with nitrites (Japanese published unexamined patent application No. 141188/1978), (7) a carboxylic acid membrane prepared by reduction treatment of only one surface of polymer-A film (Japanese published unexamined patent applications Nos. 24175/1977, 24176/1977 and 24177/1977), (8) a carboxylic acid membrane prepared by oxidation treatment of only one surface of polymer-A film with an organic solvent vapor (Japanese published unexamined patent application No. 83932/1979), (9) a membrane wherein carboxylic acid groups and sulfonamide groups are present in a mixed state prepared by the treatment of only one surface of polymer-A film with a basic aqueous solution of a compound having amino group or that containing ammonium ions (Japanese published unexamined patent applications Nos. 21478/1979 and 41287/1979) and (10) a phosphoric acid membrane prepared by the reaction of only surface of polymer-A film and iodine in the presence of a radical generator followed by the treatment with a phosphorous compound (Japanese published unexamined patent application No. 82684/1978). However, the present invention is not limited only to these membranes.

There can be illustrated methods to roughen the surface of a homogeneous cation exchange membrane such as (1) one wherein a die having a desired concavo-convex pattern is used as the forming die when the ion exchange membrane is prepared by extrusion molding, (2) one wherein the ion exchange membrane is allowed to pass through between the rotating mat rolls having desired concavo-convex pattern under heating, (3) one wherein a cation exchange membrane and a laminated material of cloth, paper, fine powder of organic or inorganic material, etc. are superposed and heat-pressed, (4) one wherein the surface of an ion exchange membrane is subjected to abration with an abrasive, (5) one wherein an ion exchange membrane is allowed to pass through between the rolls whose surfaces are wrapped with sand papers, (6) one wherein an abrasive is blown against an ion exchange membrane with compressed air (dry blast method) or an abrasive suspended in water is blown against an ion exchange membrane with compressed air (liquid honing method), (7) one wherein the surface of an ion exchange membrane is ground with a metal brush, (8) one wherein the discharge treatment such as are discharge or glow discharge is used, (9) one wherein ultraviolet rays, X-rays, electron rays, radioactive rays or the like is irradiated on the surface of a membrane, (10) one wherein the treatment with gas flame, hot air, or the like is carried out, (11) one wherein an ion exchange membrane is treated with a solvent and (12) one wherein a mesh, non-woven fabric or the like made of an ion exchange resin is bonded to the surface of a membrane. However, the method is not limited to these ones.

When the surface of an ion exchange membrane prepared by superposing two or three sheets or more of film each having different equivalent weight and/or different kind of ion exchange group and laminating them is roughened, dry blast method, liquid honing method and a method using glow discharge are desirable. When two kinds of film or more are laminated to prepare an ion exchange membrane having a multi-layer structure, it is extremely difficult to make the lower water content layer have a thickness not higher than $30\mu$ because of the limitation on the manufacturing process of each film and, in addition, the laminating process to unify them. However, when the method mentioned above is selected as the roughening method, the scraping of the film is advanced simultaneously with the roughening and thus, it is possible to make the lower water content layer extremely thin. Consequently, the electrolysis voltage is remarkably lowered owing to no attachment of hydrogen gas to the membrane surface and, in addition, the effect of decreasing electric resistance of the membrane itself because of making the lower water content layer having a high electrical resistance extremely thin. On the one hand, the current efficiency is, surprisingly, not decreased though the lower water content layer is made thin to some extent. That is, the current efficiency and the electrolysis voltage shown by the multi-layer membrane depend upon the electrolysis conditions and equivalent weight, water content, thickness, etc. of each of the anode side layer and the cathode side layer when the membrane is incorporated into the electrolysis cell; however, as the result of the study wherein the relationship between the current efficiency or the electrolysis voltage and the thickness of the cathode side layer, namely the lower water content layer was investigated under the same conditions except the thickness, it was found that, though the current efficiency was increased till the thickness reached to a certain level, it was almost the same when the thickness exceeded that level. On the other hand, from the viewpoint of the electrolysis voltage, the thinner the thickness of the lower water content layer is, the lower and more advantageous is the electrolysis voltage. In short, it was found that there is an optimum value in the thickness of the lower water content layer.

In order to maintain the current efficiency at a high level, it is necessary that the thickness of the lower water content layer is at least $1\mu$ or more, preferably $3\mu$ or more. The current efficiency does not vary even though the thickness exceeds $3\mu$ and it is especially preferable that the thickness is $5\mu$ or more in the case of industrial production. On the contrary, excessively large thickness is not desirable because the electrolysis voltage is raised up. A thickness of $20\mu$ or less, preferably $10\mu$ or less is desirable.

Particularly, in the case of a multi-layer membrane prepared by backing a higher water content layer with a reinforcing fabric according to the vacuum lamination method, though the surface of the higher water content layer is smooth, there are remarkable concavo-convex portions in the surface of the lower water content layer due to fibers constituting the fabric; consequently, when such methods as one wherein an abrasing tool such as a metal brush or grinding rolls is used and liquid honing method are used, the scraping rate at convex portions is higher than that at concarvo portions resulting in not uniform thickness of the lower water content layer after roughening; therefore, if it is desired to surely keep the minimum thickness at convex portions of the lower water content layer, it is impossible to make the lower water content layer very thin. On the contrary, the roughening of the surface according to the glow discharge method is advantageous because concave portions can be sufficiently scraped and the thickness of the lower water content layer is made uniform whereby the lower water content layer can be made thinner.

Heat-press method is also one of the advantageous methods in order to carry out the uniform roughening treatment to the surface of cation exchange membrane having surface undurations due to supporting fibers. Roughening treatment may be applicable on both surfaces of an ion-exchange membrane, but desirable decrease in electrolysis voltage can be attained by application of roughening treatment on only one surface. The roughening treatment of the present invention may also be applied to an ion-exchange membrane intermediate. Such an ion-exchange membrane intermediate is, after roughening treatment, subjected to such a treatment as hydrolysis, introduction of ion-exchange groups or formation of multi-layer to be provided for use as a cation exchange membrane.

As an alkali metal chloride to be used in the present invention, there can be illustrated lithium chloride, sodium chloride, potassium chloride and the like. As the alkali metal hydroxide, there can be illustrated lithium hydroxide, sodium hydroxide, potassium hydroxide and the like.

The most important point in carrying out the electrolysis process according to the present invention is to insert a homogeneous cation exchange membrane into an electrolytic cell so that the roughened surface of the membrane faces toward the cathode side. If the membrane is incorporated into an electrolytic cell so that the roughened surface faces toward the anode side, it is not possible to achieve the decrease of electrolysis voltage.

The preferable electrolytic cell and electrolysis conditions to be used in the present invention will be mentioned below. The electrolysis is performed while feeding a salt water to the anode compartment and water or a dilute aqueous alkali metal hydroxide solution to the cathode compartment whereby the concentration of the alkali metal hydroxide at the outlet of the cathode compartment is controlled.

The salt water fed to the anode compartment is purified according to the method used in the conventional electrolysis of an alkali metal chloride. That is, the salt water recycled from the anode compartment is subjected to such treatments as dechlorination, dissolution of alkali chloride to saturation, precipitation and separation of magnesium, calcium, iron, etc. and neutralization. These steps may be conducted similarly to those in the prior art. If desired, however, the feed salt water is preferably purified with granular ion-exchange resins, especially chelate resins, to get a permissible calcium content, preferably 1 ppm or less. The concentration of salt water is preferably as high as possible, namely at approximately saturated concentration.

Though the percentage utilization of alkali metal chloride fed to the anode compartment varies in a range of 5–95% depending on the current density and the method for removing heat, it is generally desirable to be as high as possible.

The electrolysis temperature may be in the range from 0° to 150° C.

The heat generated by electrolysis is eliminated by cooling a part of anolyte or catholyte.

There are also generated chlorine and hydrogen gases from the anode compartment and the cathode compartment, respectively. In a specifically devised electrolytic cell so that such gases can be led to the backside of the electrodes to ascend therealong, there can be obtained the effects of decreasing electrolysis voltage and smaller power consumption.

It is desirable to stir the electrolyte in each compartment with gases generated from the cathode and anode compartments in addition to the stirring caused by the flow of liquids supplied from the outside; for this purpose, a porous electrode such as a metal mesh electrode may preferably be used for effecting stirring with ascending flow of gases to move the liquid in each compartment under circulation.

As the electrodes used, it is desirable that the cathode is made of an iron or an iron plated with nickel or a nickel compound from the standpoint of overvoltage and the anode is made of a metal mesh coated with an oxide of a noble metal such as ruthenium.

The present invention is explained in detail with reference to the following examples practiced; however, the present invention is not limited to them.

EXAMPLE 1

Tetrafluoroethylene and perfluoro-3, 6-dioxy-4-methyl-7-octenesulfonyl fluoride were copolymerized in 1,1,2-trichloro-1,2,2-trifluoroethane using perfluoropropionyl peroxide as the polymerization initiator at a polymerization temperature of 45° C. while maintaining the pressure of tetrafluoroethylene at 5 kg/cm$^2$ (g). The resultant copolymer is hereafter referred to as polymer-1. The same procedure was repeated except that the copolymerization was carried out while maintaining the pressure of tetrafluoroethylene at 3 kg/cm$^2$ (g). The resultant copolymer is hereafter referred to as polymer-2.

Polymers-1 and -2 were molded under heating respectively to form a film having a thickness of 100 microns. Then they were hydrolyzed and the water content and the equivalent weight according to the titration method thereof were measured. The water content of polymers-1 and -2 were 10% and 21%, respectively, and the equivalent weight were 1500 and 1110, respectively.

Polymers-1 and -2 were molded under heating to form a film having a thickness of 50 microns and one having a thickness of 100 microns, respectively; both of them were laminated to form a two-layer laminate. Furthermore, Teflon® fabric was embedded according to the vacuum lamination method from the surface of the polymer-2 to prepare a composite material, which was then subjected to hydrolysis treatment to give a sulfonic acid type ion-exchange membrane.

The surface of polymer-1 is hereafter referred to as surface-A.

Said sulfonic acid type ion-exchange membrane was subjected to the roughening treatment according to the heat-press method. A silicone rubber sheet (upper layer) having a thickness of 3 mm, a layer of light weight magnesium oxide powders (produced by Wako Junyaku Kogyo Co., Ltd.) having a thickness of 1 mm, a wetted sulfonic acid type cation exchange membrane (the surface of the layer having an equivalent weight of 1500 (surface-A) was faced upward), a silicone rubber having a thickness of 3 mm and a 60-mesh metal (bottom layer) were laminated and subjected to heat-press under the pressure of 10 kg/cm$^2$ while heating at 280° C. for 10 minutes. Then, magnesium oxide adhered to the membrane was removed by dissolving it with hydrochloric acid. The roughness of surface-A of said roughened cation exchange membrane was measured and it was found that the maximum height was 0.6 micron and there were formed about 45 concavo-convex portions having roughness of 0.05 micron or more per 1 mm.

The membrane thus prepared was incorporated into a transparent electrolytic cell made of acrylic resin with surface-A facing toward the cathode side and electrolysis of sodium chloride was conducted at a current density of 50 A/dm$^2$ and at an electrolysis temperature of 90° C. The anode was a dimensionally stable electrode made of titanium substrate coated with ruthenium oxide and the cathode was an iron mesh. There were fed 3 N aqueous solution of sodium chloride having a pH of 2 to the anode compartment and 5 N aqueous solution of sodium hydroxide was fed to the cathode compartment. The electrolysis voltage was 3.75 V and the current efficiency was 80%. There was no attachment of hydrogen gas bubble to the cathode side surface of the membrane. The resistance of said membrane was 6.3 Ω.cm$^2$.

REFERENCE 1

Electrolysis was conducted in the same manner as in Example 1 except for using a membrane prepared by no roughening treatment in place of the membrane used in Example 1 subjected to heat-press for roughening treatment.

The electrolysis voltage was 4.05 V and the current efficiency was 79.5%. There was seen a remarkable attachment of hydrogen gas bubbles to the cathode side surface of the membrane which had not been subjected to roughening treatment. The membrane not subjected to the surface roughening treatment had resistance of 6.3 Ω.cm$^2$.

EXAMPLES 2–7

Tetrafluoroethylene and perfluoro-3,6-dioxy-4-methyl-7-octenesulfonyl fluoride were copolymerized to obtain a polymer having an equivalent weight of 1100 (polymer-A) and a polymer having an equivalent weight of 1500 (polymer-B). These copolymers were molded under heating to form film-like materials having thicknesses of 120 microns and 50 microns, respectively. Said film-like materials were united (laminated) and then backed with plain fabrics for reinforcement according to the vacuum lamination method. At that time, the preparation conditions were so selected that the reinforcing fabrics were wrapped in the layer of polymer-A. The product thus prepared was hydrolyzed with sodium hydroxide to produce a sulfonic acid type cation exchange membrane.

The layer of polymer-B having a larger equivalent weight (layer-C) of the fluorocarbon type cation exchange membrane thus obtained having a multi-layer structure was ground according to the glow discharge method. That is, the dry cation exchange membrane was placed on one of the electrodes so that layer-C faced upwards and glow discharge was carried out between it and the other electrode confronting upwards therewith whereby only layer-C of the membrane was ground. The inner pressure of the discharging apparatus was decreased down to $10^{-2}$ Torr and then oxygen gas was blown into the apparatus so that the pressure reached $10^{-1}$ Torr; the glow discharge was conducted at a discharge power of 0.6 W/cm and at a frequency of 13.56 MHz. As the electric discharge energy, 6 levels of 1400, 1900, 2200, 2300, 2350 and 2400 W.sec/cm$^2$ were selected.

Then the surface of layer-C of said cation exchange membrane was again subjected to abrasion treatment according to the liquid honing method. As the abrasive, alumina powders having an average particle diameter of 10 microns were used and they were blown with compressed air having a pressure of 6.5 kg/cm$^2$. The blowing time was 1 minute per 1 dm$^2$ of membrane.

The thickness of layer-C of the membrane thus obtained was measured and the result is shown in Table 1. Each of these membranes was incorporated into the electrolytic cell so that the ground layer-C was faced to the cathode side. The electrolysis of sodium chloride was conducted at a current density of 50 A/dm$^2$ and at a temperature of 90° C. The anode was the dimensionally stable electrode made of titanium substrate coated with ruthenium oxide and the cathode was iron mesh. A 3 N aqueous solution of sodium chloride having a pH of 2 was fed to the anode compartment and a 5.0 N aqueous solution of sodium hydroxide was fed to the cathode compartment. The electrolysis voltage and the current efficiency were measured. The results are shown in Table 1.

TABLE 1

|  | Electric discharge energy (W. sec/cm$^2$) | Thickness of layer-C ($\mu$) | Electrolysis voltage (V) | Current efficiency (%) |
|---|---|---|---|---|
| Example 2 | 1400 | 20.8 | 3.63 | 82.2 |
| Example 3 | 1900 | 9.9 | 3.53 | 81.8 |
| Example 4 | 2200 | 5.0 | 3.48 | 82.1 |
| Example 5 | 2300 | 3.2 | 3.46 | 82.0 |
| Example 6 | 2350 | 2.1 | 3.45 | 74.9 |
| Example 7 | 2400 | 1.2 | 3.44 | 65.3 |

EXAMPLES 8–11 AND REFERENCE 2

According to the process similar to that in Example 1, tetrafluoroethylene and perfluoro-3,6-dioxy-4-methyl-7-octenesulfonyl fluoride were copolymerized to obtain a polymer having a water content of 14% and an equivalent weight of 1350 (polymer-1) and one having a water content of 22% and an equivalent weight of 1090 (polymer-2).

These polymers were molded under heating to form a double-layer laminated material consisting of a layer having a thickness of 35 microns (polymer-1) and one having a thickness of 100 microns (polymer-2), respectively, into which Teflon ® fabric was further embedded from the surface of polymer-2 according to the vacuum lamination method. Said laminated material was hydrolyzed to obtain a sulfonic acid type cation exchange membrane and only the surface of polymer-1 thereof was subjected to reduction treatment to convert the existing groups to carboxylic acid groups (surface-A).

Then the surface-A of said cation exchange membrane was subjected to roughening treatment according to the liquid honing method.

Liquid honing is a grinding method wherein an abrasive suspended in water is blown to the material to be treated with compressed air. In this Example, an aqueous suspension of emery having an average particle diameter of 10 microns (Trade name: FO #1200, produced by Fujimi Kenmazai Kogyo Co., Ltd.) was blown to the material to be treated with compressed air having a pressure of 3 kg/cm$^2$ to the material to be treated. Blowing time were 10, 30, 60 and 120 seconds per 1 dm$^2$ of the membrane.

The roughness of the surface-A of the roughened membrane thus obtained was measured. The result is shown in Table 2. Each of these membranes was incorporated into an electrolytic cell so that the surface-A faced towards cathode side. Electrolysis was conducted according to the procedure similar to that in Example 1. The situation of gas attachment to the membrane surface was observed and the electrolysis voltage and the current efficiency were measured. The results are shown in Table 2.

TABLE 2

|  | Blowing time (sec.) | Maximum height (micron) | Number of concavo-convex portions having a roughness of 0.05$\mu$ or more (count/mm) | Situation of gas attachment | Electrolysis voltage (V) | Current efficiency (%) |
|---|---|---|---|---|---|---|
| Reference 2 | 0 | 0.04 | 4 | very remarkable | 4.05 | 96.0 |
| Example 8 | 10 | 0.20 | 11 | remarkable | 4.00 | 95.8 |
| Example 9 | 30 | 0.27 | 25 | almost none | 3.80 | 96.0 |
| Example | 60 | 0.30 | 50 | none | 3.75 | 96.2 |

TABLE 2-continued

| | Blowing time (sec.) | Maximum height (micron) | Number of concavo-convex portions having a roughness of 0.05μ or more (count/mm) | Situation of gas attachment | Electrolysis voltage (V) | Current efficiency (%) |
|---|---|---|---|---|---|---|
| Example 11 | 120 | 0.32 | 58 | none | 3.75 | 95.8 |

EXAMPLE 12

Tetrafluoroethylene and perfluoro-3,6-dioxy-4-methyl-7-octenesulfonyl fluoride were copolymerized to obtain a polymer having an equivalent weight of 1100 (polymer-A). Also tetrafluoroethylene and

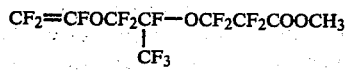

were copolymerized to obtain a polymer having an equivalent weight of 1100 (polymer-C).

After sufficiently blending polymer-A and polymer-C in a weight ratio of 1:2, the mixture was molded under heating to obtain a film-like material having a thickness of 50 microns. Apart from it, only polymer-A was molded under heating to obtain a film-like material having a thickness of 100 microns. After uniting these film-like materials and conducting hydrolysis thereof with sodium hydroxide, there was obtained a fluorocarbon type cation exchange membrane having a multi-layer structure consisting of a layer containing sulfonic acid groups and a layer containing sulfonic acid groups and carboxylic acid groups in a mixed state. The surface of the membrane layer consisting of polymer-A and polymer-C was ground according to the liquid honing method. As the abrasive, alumina powders having an average particle diameter of 10 microns (trade name; WA #1500, Fujimi Kenmazai Kogyo Co., Ltd.) were used and they were blown onto the surface of the layer consisting of polymer-A and polymer-C (layer-C) with compressed air having a pressure of 6.5 kg/cm². The blowing time was 10 minutes per 1 dm² of the membrane. The thickness of the layer-C of the membrane thus obtained was 8.5 microns. Said membrane was incorporated into an electrolytic cell so that the layer-C faced toward the cathode and the electrolysis of sodium chloride was conducted. All the conditions of electrolysis were the same as those in Examples 1, 2, 3 and 4 except for that the current density was 40 A/dm² and the concentration of the aqueous solution of sodium hydroxide fed to the cathode compartment was 6.5 N. The electrolysis voltage was 3.45 V and the current efficiency was 94%.

REFERENCE 3

Using the fluorocarbon type cation exchange membrane having a double-layer structure which was used in Example 12 and not subjected to the treatment of the present invention, the electrolysis of sodium chloride was conducted according to the procedure similar to that in Example 12. The electrolysis voltage was 3.70 V and the current efficiency was 94%.

EXAMPLE 13

Tetrafluoroethylene and perfluoro-3,6-dioxy-4-methyl-7-octenesulfonyl fluoride were copolymerized to a polymer having an equivalent weight of 1100 (polymer-A) and one having an equivalent weight of 1350 (polymer-B').

These copolymers were molded under heating to form a film-like material having a thickness of 100 microns and one having a thickness of 40 microns, respectively. Said film-like materials were united and Teflon ® fabric was embedded into the layer of polymer-A. The product thus prepared was hydrolyzed to produce a sulfonic acid type cation exchange membrane.

The layer consisting of polymer-B' of the cation exchange membrane thus obtained (layer-C) was ground according to the glow discharge method. The electric discharge energy was 1100 W.sec/cm² and other conditions were the same as those in Examples 2-5.

After sulfonic acid groups were converted to sulfonyl chloride groups by the treatment of said membrane with phosphorous pentachloride, the surface of polymer-B' was subjected to reduction treatment with hydriodic acid to convert sulfonyl chloride groups to carboxylic acid groups. Then said membrane was hydrolyzed with sodium hydroxide and dyed with Malachite Green solution of pH=1 whereby it was confirmed that, in the layer having a thickness of 10 microns of the surface subjected to the reduction treatment, the existing groups were converted to carboxylic acid groups.

The thickness of layer-C of the membrane thus obtained was 18.7 microns. Each of these membranes were incorporated into an electrolytic cell so that layer-C faced toward the cathode side and the electrolysis of sodium chloride was conducted. Electrolysis conditions were the same as those in Example 12. The electrolysis voltage was 3.56 V and the current efficiency was 96.1%.

EXAMPLES 14 AND 15

Tetrafluoroethylene and perfluoro-3,6-dioxy-4-methyl-7-octenesulfonyl fluoride were copolymerized to obtain a polymer having an equivalent weight of 1100 (polymer-A) and one having an equivalent weight of 1350 (polymer-B'). These copolymers were molded under heating to form a film-like material having a thickness of 100 microns and one having a thickness of 40 microns, respectively. Said film-like materials were united and Teflon ® fabric was embedded into the layer of polymer-A. The product thus prepared was hydrolyzed to produce a sulfonic acid type cation exchange membrane.

The layer consisting of polymer-B' of the cation exchange membrane thus obtained (layer-C) was ground according to the dry blast method. As the abrasive, silicon carbide powders having an average particle diameter of 20 microns (trade name; GC-#800, Fujimi Kenmazai Kogyo Co., Ltd.) were used and they were blown onto the membrane surface of layer-C for grinding with compressed air having a pressure of 6.0 kg/cm². The abrasion time were 8 and 9 minutes per 1 dm², respectively.

After sulfonic acid groups were converted to sulfonyl chloride groups by the treatment of said membrane with phosphorous pentachloride, the surface of polymer-B' was subjected to reduction treatment with hydriodic acid to convert sulfonyl chloride groups to carboxylic acid groups. Then said membrane was hydrolyzed with sodium hydroxide and dyed with Malachite Green solution of pH=1 whereby it was confirmed that, in the layer having a thickness of 10 microns of the surface subjected to the reduction treatment, the existing groups were converted to carboxylic acid groups.

The thickness of layer-C of the membrane thus obtained was measured. The results are shown in Table 3. Each of these membranes was incorporated into an electrolytic cell so that layer-C faced toward the cathode side and the electrolysis of sodium chloride was conducted. Electrolysis conditions were the same as those in Example 13. The electrolysis voltage and the current efficiency are shown in Table 3.

REFERENCE 4

There was measured the thickness of layer-C of the cation exchange membrane prepared according to the procedure similar to that in Examples 13–15 except that the abration treatment of the present invention was not carried out. The results are shown in Table 3. Further, said membrane was incorporated into an electrolytic cell so that layer-C faced toward the cathode side and the electrolysis was conducted according to the procedure similar to that in Example 12. The electrolysis voltage and the current efficiency are shown in Table 3.

TABLE 3

| | Blowing time (min./dm²) | Thickness of layer-C ($\mu$) | Electrolysis voltage (V) | Current efficiency (%) |
|---|---|---|---|---|
| Reference 4 | 0 | 40.8 | 3.75 | 96.2 |
| Example 14 | 8 | 8.3 | 3.50 | 96.4 |
| Example 15 | 9 | 4.4 | 3.47 | 96.2 |

EXAMPLE 16

Tetrafluoroethylene and perfluoro-3,6-dioxy-4-methyl-7-octenesulfonyl fluoride were copolymerized to obtain a polymer having an equivalent weight of 1100 (polymer-A). Also tetrafluoroethylene and

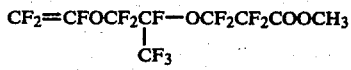

were copolymerized to obtain a polymer having an equivalent weight of 1100 (polymer-C).

After sufficiently blending polymer-A and polymer-C in a weight ratio of 1:2, the mixture was molded under heating to obtain a film-like material having a thickness of 50 microns. Apart from it, only polymer-A was molded under heating to obtain a film-like material having a thickness of 100 microns. After uniting these film-like materials, Teflon ® fabric was embedded from the surface of polymer-A according to the vacuum lamination method. Then the product was hydrolyzed with sodium hydroxide to obtain a fluorocarbon type cation exchange membrane having a multi-layer structure consisting of a layer of sulfonic acid and a layer wherein carboxylic acid groups and sulfonic acid groups are present in a mixed state.

The surface of the membrane layer consisting of polymer-A and polymer-C (layer-C) was ground according to the glow discharge method. The electric discharge energy was 1800 W.Sec/cm² and other conditions were the same as those in Examples 2–7. Then said cation exchange membrane was again subjected to grinding according to the dry blast method. Alumina powders having an average particle diameter of 13 microns (trade name: WA-#1200, Fujimi Kenmazai Kogyo Co., Ltd.) were blown onto the surface of layer-C with compressed air having a pressure of 6.5 kg/cm². Blowing time was 3 minutes per 1 dm² of membrane. The thickness of layer-C of the membrane thus obtained was 9.6 microns. Using said membrane, the electrolysis was carried out according to the conditions same as those in Example 12. The electrolysis voltage was 3.64 V and the current efficiency was 94.2%.

REFERENCE 5

Using the fluorocarbon type cation exchange membrane having a multi-layer structure which was used in Example 16 and not subjected to the treatment of the present invention, the electrolysis of sodium chloride was conducted according to the procedure similar to that in Example 16. The electrolysis voltage was 3.90 V and the current efficiency was 94%. The thickness of layer-C of said membrane was 50.4 microns.

EXAMPLE 17

According to the procedure similar to that in Example 1, tetrafluoroethylene and perfluoro-3,6-dioxy-4-methyl-7-octenesulfonyl fluoride were copolymerized to obtain a polymer having a water content of 18% and an equivalent weight of 1200. After said polymer was molded under heating to obtain a film having a thickness of 125 microns, only one surface was treated with n-butylamine to produce a layer of sulfonamide having a thickness of 20 microns (surface-A). Then Teflon ® fabric was embedded from the opposite side to surface-A and the product was subjected to hydrolysis treatment to obtain a sulfonamide type cation exchange membrane. Apart from this, using the membrane wherein the layer of sulfonamide was produced over the whole thickness, the water content was measured and found to be 8%.

Said cation exchange membrane was subjected to roughening treatment according to the dry blast method. The dry blast is a method wherein the abrasive is blown to the material to be ground by compressed air. In this Example, alumina powders having an average particle diameter of 20 microns (trade name: WA #800, Fujimi Kenzai Kogyo Co., Ltd.) were blown onto surface-A with compressed air having a pressure of 2 kg/cm². The blowing time was 1 minute per 1 dm² of membrane. Said roughening treatment produced about 45 concavo-convex portions per 1 mm with the maximum height of 0.5 micron and the roughness of 0.05 micron or more on the surface of the membrane.

The cation exchange membrane thus obtained was incorporated into an electrolytic cell so that the roughened surface (surface-A) faced toward the cathode side and the electrolysis was conducted according to the procedure similar to that in Example 1. In this Example, the electrolysis was conducted at a current density of 30 A/dm².

The electrolysis voltage was 3.60 V and the current efficiency was 84%. No attachment of hydrogen gas bubble was observed on the cathode side surface of the cation exchange membrane.

REFERENCE 6

Instead of the roughened sulfonamide type cation exchange membrane in Example 17, a sulfonamide type cation exchange membrane subjected to no roughening treatment was used and the electrolysis was conducted according to the procedure similar to that in Example 11.

The electrolysis voltage was 3.85 V and the current efficiency was 83.3%. Very remarkable attachment of hydrogen gas bubbles was observed on the cathode side of the cation exchange membrane.

EXAMPLE 18

According to the procedure similar to that in Example 1, tetrafluoroethylene and perfluoro-3,6-dioxy-4-methyl-7-octenesulfonyl fluoride were copolymerized to obtain a polymer having a water content of 14% and an equivalent weight of 1350 (polymer-1) and one having a water content of 22% and an equivalent weight of 1090 (polymer-2).

These polymers were molded under heating to form a double-layer laminated material consisting of a layer having a thickness of 35 microns (polymer-1) and one having a thickness of 100 microns (polymer-2) and additionally Teflon ® fabric was embedded from the surface of polymer-2 according to the vacuum lamination method. Said laminated material was subjected to hydrolysis treatment to produce a sulfonic acid type cation exchange membrane.

Then said cation exchange membrane was subjected to the roughening treatment according to the glow discharge method. That is, the dry cation exchange membrane was placed on the cathode so that the surface of polymer-1 (surface-A) faced upward and glow discharge was carried out between it and the anode confronting upward therewith whereby only surface-A of the membrane was subjected to the roughening treatment. The inner pressure of the discharging apparatus was decreased down to $10^{-2}$ Torr and then oxygen gas was blown into the apparatus so that the pressure reached $10^{-1}$ Torr; the glow discharge was conducted at a discharge power of 0.6 W/cm$^2$ and at an electric discharge energy of 200 W.sec/cm$^2$. Said roughening treatment produced about 60 concavo-convex portions per 1 mm with the maximum height of 0.7 micron and the roughness of 0.05 micron or more on surface-A.

Only surface-A of the roughened membrane thus obtained was subjected to reduction treatment to obtain a carboxylic acid type cation exchange membrane. Said membrane was incorporated into an electrolytic cell so that surface-A faced toward the cathode side and the electrolysis was conducted according to the procedure similar to that in Example 1. The electrolysis voltage was 3.75 V and the current efficiency was 96%. No attachment of hydrogen gas bubble was observed on the cathode side surface of the cation exchange membrane.

What we claim is:

1. A cation exchange membrane having a multi-layer structure consisting essentially of two or more layers each having a different equivalent weight and/or a different kind of ion exchange group, wherein at least the outer layer of said membrane having the lower water content of both outer layers of said membrane has a surface which is roughened to thereby prevent the adhesion of gas bubbles to the surface thereof during electrolysis.

2. The cation exchange membrane according to claim 1 wherein said cation exchange membrane is a fluorocarbon type cation exchange membrane.

3. The cation exchange membrane according to claim 1 wherein said cation exchange membrane has a roughened surface wherein 20 concavo-convex portions or more per 1 mm having a roughness of 0.05 micron or more are present.

4. The cation exchange membrane according to claim 1, 2 or 3 wherein said cation exchange membrane has a surface subjected to a roughening treatment according to a heat-press method after the membrane is superimposed on a molded material.

5. The cation exchange membrane according to claim 1, 2 or 3 wherein said cation exchange membrane has a surface subjected to a roughening treatment according to a dry blast method.

6. The cation exchange membrane according to claim 1, 2 or 3 wherein said cation exchange membrane has a surface subjected to a roughening treatment according to a liquid honing method.

7. The cation exchange membrane according to claim 1, 2 or 3 wherein said cation exchange membrane has a surface subjected to a roughening treatment according to a glow discharge method.

8. A fluorocarbon type multi-layer membrane prepared by uniting two membranes each having a different equivalent weight and/or a different kind of ion exchange group, wherein the outer layer having the lower water content is ground after unification whereby the thickness thereof is made thinner than that immediately after the unification, said outer layer having a roughness which prevents adhesion of gas bubbles to the surface thereof during electrolysis.

9. The membrane according to claim 8 wherein the thickness of the lower water content layer is 3–20 microns.

10. The membrane according to claim 8 wherein the thickness of the lower water content layer is 5–10 microns.

11. The membrane according to claim 8, 9 or 10 wherein the grinding is conducted according to a glow discharge treatment.

12. The method according to claim 8, 9 or 10 wherein the grinding is conducted according to a liquid honing method.

13. The method according to claim 8, 9 or 10 wherein grinding is conducted according to a dry blast method.

* * * * *